United States Patent Office

3,598,774
Patented Aug. 10, 1971

3,598,774
ANTIMONY SULFIDE IN ELECTRO-
DEPOSITABLE COMPOSITIONS
Rowland S. Hartzell, Gibsonia, Pa., and Gerald R. Gacesa, Franklin, Wis., assignors to PPG Industries, Inc., Pittsburgh, Pa.
No Drawing. Continuation-in-part of application Ser. No. 790,875, Jan. 13, 1969, which is a division of application Ser. No. 598,160, Dec. 1, 1966. This application Nov. 10, 1969, Ser. No. 875,482
Int. Cl. C08g *51/04*
U.S. Cl. 260—18R      4 Claims

ABSTRACT OF THE DISCLOSURE

This invention relates to novel, pigmented electrodepositable compositions. More particularly, this invention relates to the use of antimony sulfide in pigmentary form to produce black or dark-colored electrodepositable compositions.

---

CROSS-REFERENCES TO RELATED APPLICATIONS

This application is a continuation-in-part application of U.S. Ser. No. 790,875, filed Jan. 13, 1969, now abandoned, which in turn is a divisional application of U.S. Ser. No. 598,160, filed Dec. 1, 1966, now abandoned.

This invention relates to novel, pigmented electrodepositable compositions. More particularly, this invention relates to the use of antimony sulfide in pigmentary form to produce black or dark-colored electrodepositable compositions.

Recently, electrodeposition has been achieving wide industrial acceptance as a method of applying protective coatings. The coatings achieved have excellent properties for many applications and electrodeposition results in a coating which does not run or wash off during baking. Virtually any conductive substrate may be coated by electrodeposition. The most commonly employed substrates include the base metals such as iron, steel, aluminum, copper, zinc, brass, tin, nickel and chromium, as well as other metals and pretreated metals, thin metal films, impregnated paper or other substrates rendered conductive under the conditions employed may also be coated.

Electrodeposition of certain materials, including waxes, natural and synthetic resins, have been known in the art for some time. Likewise, a recent U.S. Pat. No. 3,230,162, describes a method and compositions presently utilized in the field of automotive finishing and industrial coatings.

While electrodeposition is, in many respects, advantageous compared to ordinary application methods, problems have arisen in the fact that carbon black, universally-used black pigment, displays several undesirable characteristics in electrodeposition composition. While carbon black pigments successfully deposit in electrodeposition compositions at low voltages, at higher voltages (for example, above about 200 volts), a problem of "pig-skinning" is encountered. "Pig-skinning" may be defined as a rough, uneven surface, as compared to the normally desirable smooth surface obtained in a conventional paint formulation.

It has now been found that the use of antimony sulfide as a pigment substitute for carbon black produces black or dark brown films which may be coated at higher voltages to produce smooth films. The pig-skinning problem is an inherent characteristic of carbon black which is not encountered with the antimony sulfide. Apparently, the vehicle resin plays little part in producing this effect, and improvement is seen in substituting antimony sulfide for carbon black in virtually every electrodepositable composition.

In the electrodeposition process, the articles to be electrocoated are immersed in an aqueous dispersion of a solubilized, ionized, film-forming material such as a synthetic organic vehicle resin. An electric current is passed between the article to be coated serving as an electrode and a counterelectrode to cause deposition of a coating of the vehicle resin on the articles. The articles are then withdrawn from the bath, usually rinsed and then the coating either air-dried or baked in the manner of a conventional finish.

A number of electrodepositable resins are known and can be employed to provide the electrodepositable compositions which may be treated by the process of this invention. Virtually any water-soluble, water-dispersible or water-emulsifiable polyacid or polybasic resinous material can be electrodeposited and, if film-forming, provides coatings which may be suitable for certain purposes. Any such electrodepositable composition is included among those which can be employed in the present invention, even though the coating obtained might not be entirely satisfactory for certain specialized uses.

Presently, the most widely used electrodeposition vehicle resins are synthetic polycarboxylic acid resinous materials which include a reaction product or adduct of the drying oil or semi-drying oil fatty acid ester with a dicarboxylic acid or anhydride. By drying oil or semi-drying oil fatty acid esters are meant esters of fatty acids which are or can be derived from drying oils or semi-drying oils, or from such sources as tall oil. Such fatty acids are characterized by containing at least a portion of polyunsaturated fatty acids. Preferably, the drying oil or semi-drying oil per se is employed. Generally, drying oils are those oils which have an iodine value of above about 130, and the semi-drying oils are those which have an iodine value of about 90 to 130, as determined by method ASTM–D1467–57T. Examples of such esters include linseed oil, soya oil, safflower oil, perilla oil, tung oil, oiticica oil, poppyseed oil, sunflower oil, tall oil esters, walnut oil, dehydrated castor oil, herring oil, menhaden oil, sardine oil, and the like.

Also included among such esters are those in which the esters themselves are modified with other acids, including saturated, unsaturated or aromatic acids, such as butyric acid, stearic acid, linoleic acid, phthalic acid, isoophthalic acid, terephthalic acid or benzoic acid, or anhydride of such an acid. One inexpensive acid material which has been found to produce good results in many instances is rosin, which is composed of chiefly abietic acid and other resin acids. The acid-modified esters are made by transesterification of the ester, as by forming a di- or monoglyceride by alcoholysis, followed by esterification with the acid; they may also be obtained by reacting oil acids with a polyol and reacting the acid with the partial ester. In addition to glycerol, alcoholysis can be carried out using other polyols, such as trimethylolpropane, pentaerythritol, sorbitol, and the like. If desired, the esters can also be modified with monomers such as cyclopentadiene or styrene, and the modified esters produced thereby can be utilized herein. Similarly, other esters of unsaturated fatty acids, for example, those prepared by the esterification of tall oil fatty acids with polyols, are also useful.

Also included within the term "drying oil fatty acid esters" as set forth herein are alkyd resins prepared utilizing semi-drying or drying oils; esters of epoxides with such fatty acids, including esters of diglycidyl ethers of polyhydric compounds, as well as other mono-, di- and polyepoxides, semi-drying or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha, beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances it requires more stringent conditions than the unsaturated dicarboxylic acid anhydrides or acids which form such anhydrides. Mixtures of any of the above acids or anhydrides may also be utilized. Generally speaking, the anhydride or acid employed contains from 4 to 12 carbon atoms, although longer chain compounds can be used if so desired.

While the exact nature of the reaction product of the acid or anhydride with the fatty acid ester is not known with certainty, it is believed that the reaction takes place by addition of the unsaturated linkage of the acid or anhydride to the carbon chain of the oil. In the case of non-conjugated double bonds, such as are present in linseed oil, the reaction may take place with the methylene group adjacent the non-conjugated double bond. In the case of oils having conjugated double bonds, such as tung oil, the reaction is probably of the Diels-Alder type.

The reaction between the acid or acid anhydride and the drying oil or semi-drying oil fatty acid ester takes place readily without the use of a catalyst and at temperatures in the range of about 100° C. to about 300° C. or higher, with the reaction generally being carried out between about 200° C. and about 250° C.

While the reaction products can be comprised solely of adducts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion and which may have other similar desirable characteristics. For this purpose, any ethylenically unsaturated monomer can be employed. Examples of such monomers include monoolefinic and diolefinic hydrocarbons such as styrene, alpha-methyl styrene, alpha-butyl styrene, vinyl toluene, butadiene-1,3, isoprene, and the like; halogenated monoolefinic and diolefinic hydrocarbons, such as alpha-chlorostyrene, alpha-bromostyrene, chlorobutadiene and similar compounds; esters of organic and inorganic acids, such as vinyl acetate, vinyl propionate, vinyl 2-chlorobenzoate, methyl acrylate, ethyl methacrylate, butyl methacrylate, heptyl acrylate, decyl methacrylate, methyl crotonate, isopropenyl acetate, vinyl alpha-bromopropionate, vinyl alpha-chlorovalerate, allyl chloride, allyl cyanide, allyl bromide, allyl acetate, dimethyl itaconate, dibutyl itaconate, ethyl alpha-chloroacrylate, isopropyl alpha-bromoacrylate, decyl alpha-chloroacrylate, dimethyl maleate, diethyl maleate, dimethyl fumarate, diethyl fumarate, and diethyl glutaconate; organic nitriles, such as acrylonitrile, methacrylonitrile, ethacrylonitrile, and the like.

As is apparent from the above discussion and the examples set forth, which, of course, do not include all of the ethylenically unsaturated monomers which may be employed, any such monomer can be utilized. The preferred class of monomers can be described by the formula:

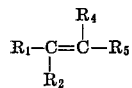

where $R_1$ and $R_2$ are hydrogen or alkyl, $R_4$ is hydrogen, alkyl or carboxyalkyl and $R_5$ is cyano, aryl, alkyl, alkenyl, aralkyl, alkaryl, alkoxycarbonyl or aryloxycarbonyl. The preferred compounds are styrene, substituted styrene, alkyl acrylates, alkyl methacrylates, diolefins and acrylonitrile.

The reaction of the fatty acid ester, the acid or anhydride and any additional monomer or monomers can be carried out concurrently, that is, with each of the components of the reaction product being mixed together and heated to reaction temperature. However, because the monomer and the acid or anhydride are often quite reactive with each other, the oil or other fatty acid ester is preferably first reacted with the acid or acid anhydride, and then this product is subsequently reacted with any ethylenically unsaturated monomer or monomers employed. For example, a reaction product of linseed oil, maleic anhydride and styrene is made by first reacting maleic anhydride with linseed oil and then reacting the maleinized oil with styrene. When the process is carried out in this manner, the reaction of the additional monomer with the initial reaction product is usually carried out at somewhat lower temperatures, usually between about 25° C. and 200° C.

The proportions of each of the components going to make up the reaction product are ordinarily not critical. Generally speaking, between about 10 percent and about 45 percent by weight of the unsaturated acid or acid anhydride is reacted with from about 55 percent to about 90 percent by weight of fatty acid ester. In the presently preferred products, usually 15 percent to 30 percent of anhydride and 70 percent to 85 percent of oil ester are employed. If an ethylenically unsaturated monomer is incorporated in the reaction product, it is typically used in amounts between about 5 percent and about 35 percent by weight, based upon the total weight of acid of anhydride and ester, with between 10 percent and 25 percent being used in those products preferred at present. Thus, in most instances, the total composition of the reaction product may comprise from about 35 percent to about 90 percent by weight of the fatty acid ester and from about 10 percent to about 65 percent of the acid or anhydride and other monomer combined, with between about 6 percent and about 45 percent of the acid or anhydride always present.

The products produced in the above manner are comprised of polymeric chains of moderate length. The average molecular weight of the products to be used in electrodeposition should be low enough so that its flow characteristics at high solids are maintained, but high enough to provide adequate throwing power. The desirable molecular weight levels vary with the coating composition and conditions employed. Generally, those products having molecular weights of up to 10,000 or somewhat higher have given the best results.

Neutralization of these products is accomplished by reaction of all or part of the dicarboxylic anhydride groups with a base, usually an amine. Usually up to about half of such groups are neutralized in unesterified adducts; the partially-esterified products are often neutralized to a greater extent, based on unesterified acid groups remaining.

It is preferred in certain instances that the neutralization reaction be carried out in such a manner that amido groups are attached to part of the carbonyl carbon atoms derived from the dicarboxylic acid or anhydride. By amido groups are meant trivalent nitrogen atoms attached with one valence to the carbonyl carbon atom with the other two valences being linked to hydrogen or carbon atoms in the same or different organic radicals. Amido groups are formed, for example, when the reaction with the neutralizing base is carried out with a water solution of ammonia, a primary amine or a secondary amine or when the product is reacted with such an amine in the absence of water.

Compositions within this general class are described in copending applications, Ser. No. 222,674, filed Sept. 10, 1962, now U.S. Pat. No. 3,366,563, and Ser. No. 282,880, filed May 24, 1963, now U.S. Pat. No. 3,369,983.

Another vehicle comprises the fatty acid ester, unsaturated acid or anhydride reaction products and any additional unsaturated modifying materials (as described above) which are further reacted with the polyol.

Essentially any polyol can be employed, but diols are preferred. When higher polyols, such as trimethylolpropane, glycerol, pentaerythritol and the like are utilized, they are employed in small amounts, or in conjunction with the diol, or in the presence of a monohydric alcohol, and are used with adducts having a relatively low proportion of acidic component. The various diols that can be employed include, for example, ethylene glycol, 1,2-propylene glycol, 1,4-butanediol, 1,5-pentanediol, 2-methyl-2-n-propyl-1,3-propanediol, and similar higher or substituted alkylene glycols, containing up to about 20 carbon atoms or more. Glycol ethers may also be employed, such as diethylene glycol, triethylene glycol, poly(oxytetramethylene) glycols and the like, those having molecular weights of up to about 400 being most useful. Water-insoluble diols are often preferable, and especially desirable water-dispersed compositions for electro-deposition are obtained using 2,2-bis(4-hydroxycyclohexyl) propane (which has given the best results), neopentyl glycol, 1,1'-isopropylidene-bis(p-phenyleneoxy)di-2-propanol, and similar diols.

The proportions of polyol and ester-anhydride adduct that are employed depend upon various factors, but are in general limited only by the need to avoid gelation of the product. The total functionality of the reactants is a guide to determining the optimum proportions to be employed, and in most instances should not be greater than about 2. By "total functionality" is meant the total number of anhydride and hydroxyl groups divided by the total number of molecules of polyol and adduct. The numbers involved are, of course, average figures, and obviously many factors are taken into consideration in determining functionality, these being well known in the art. When monomeric constituents are used, their functionality is relatively easily determined; but with resinous products such as the adducts herein, not only the proportion of anhydride in the adduct, but also the bodying effect due to heating and similar considerations should be taken into account. In any event, one can easily determine whether any particular combination of reactants results in a gelled product, and as mentioned above, gelation can often be reversed by adding a monohydric alcohol.

In most instances, the reaction products herein are made from about 65 percent to about 98 percent of ester-anhydride adduct and about 2 percent to about 35 percent of a diol, these percentages being by weight. However, it will be understood that depending upon the molecular weights of the reactants, varying amounts within these ranges or outside these ranges are employed with particular reaction systems.

In many instances, only part of the anhydride groups of the adduct, e.g., about 10 percent, are reacted with the polyol. Of those anhydride groups reacted, it is preferred that only one of the carboxyl groups is esterified in each instance. This is relatively easily accomplished because the half-ester of the dicarboxylic acid anhydride moieties present is preferentially obtained before the full ester begins to be formed. In addition, production of the full ester generally requires more stringent conditions, such as higher temperatures, even when an excess of hydroxyl groups are present. Thus, while it is not necessary that each anhydride form the half-ester and some of the dicarboxylic groups may be fully esterified, in actual practice the half-esters of the dicarboxylic acid moieties are usually obtained.

The reaction with the polyol is ordinarily carried out by admixing the initial reaction product of the fatty ester, the acid or anhydride, and any additional monomer with the polyol. The reaction at room temperature is quite slow, and thus, it is preferred to heat the reaction mixture moderately, i.e., to about 80° C. or higher. The preferred maximum temperature is that at which the full ester begins to be formed, which varies with the particular polyol and which is in most cases about 180° C., but higher temperatures up to about 300° C., can be used if desired, for example, when the number of hydroxyl groups present does not exceed the number of anhydride groups present.

When the reaction is carried out as described, the product contains a substantial part of the original acidity derived from the dicarboxylic acid or anhydride; ordinarily the product should have an acid number of at least about 20. To provide a water-dispersed product, such as is used in electrodeposition processes, at least part of the remaining acidic groups are neutralized by reaction of the partially-esterified product with a base.

The polyol reaction products are more fully described in application Ser. No. 450,205, filed Apr. 22, 1965.

Another type of electrodepositable coating composition which gives desirable results are the water-dispersible coating compositions comprising at least partially neutralized interpolymers of hydroxyalkyl esters of unsaturated carboxylic acids, unsaturated carboxylic acids and at least one other ethylenically unsaturated monomer. These are employed in the composition along with an amine-aldehyde condensation product, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids, such as ethacrylic acid, crotonic acid, maleic acid, or other acids of up to about 6 carbon atoms can also be employed. The hydroxyalkyl ester is usually hydroxyethyl or hydroxypropyl acrylate or methacrylate, but also desirable are the various hydroxyalkyl esters of the above acids having, for example, up to about 5 carbon atoms in the hydroxyalkyl radical. Mono- or diesters of the dicarboxylic acids mentioned are included. Ordinarily, the acid and ester each comprise between about 1 percent and about 20 percent by weight of the interpolymer, with the remainder being made up of one or more other copolymerizable ethylenically unsaturated monomers. The most often used are the alkyl acrylates, such as ethyl acrylate; the alkyl methacrylates, such as methyl methacrylate; and the vinyl aromatic hydrocarbons, such as styrene, but others can be utilized.

The above interpolymer is at least partially neutralized by reaction with a base as described above; at least about 10 percent, and preferably 50 percent or more of the acidic groups are neutralized, and this can be carried out either before or after the incorporation of the interpolymer in the coating composition.

The amine-aldehyde condensation products included in these compositions are, for example, condensation products of melamine, benzoguanamine, or urea with formaldehyde, although other amine-containing amines and amides, including triazines, diazines, triazoles, guanidines, guanamines, and alkyl and aryl-substituted derivatives of such compounds can be employed, as can other aldehydes, such as acetaldehyde. The alkylol groups of the products can be etherified by reaction with an alcohol, and the products utilized can be water-soluble or organic solvent-soluble.

Electrodeposition compositions comprising the above interpolymers and an amine-aldehyde resin are more fully described in U.S. Pat. No. 3,403,088.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds, such as those in which a conventional alkyd (such as a glyceryl phthalate resin), which may be modified with drying oil fatty acids, is made with a high acid number (e.g., 50 to 70) and solubilized with ammonia or an amine, or those in which a surface active agent, such as a polyalkylene glycol (e.g., "Carbowax"), is incorporated. High acid number alkyds are also made by employing a tricarboxylic acid, such as trimellitic acid or anhydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis(methoxymethyl)melamine.

The alkyd-amine compositions are dispersed in water and they ordinarily contain from about 10 percent to about 50 percent by weight of amine resin based on the total resinous components.

Yet another electrodepositable composition of desirable properties comprises mixed esters of a resinous polyol. These resin esters comprise mixed esters of an unsaturated fatty acid adduct. Generally the polyols which are utilized with these resins are essentially any polyol having a molecular weight between about 500 and 5000. Such resinous polyols include those resinous materials containing oxirane rings which can be opened in, prior to, or during the esterification reaction to provide an apparent hydroxy site. The vehicle resins are formed by reacting a portion of the hydroxyl groups of the polyol with the fatty acid, the ratio of the reactions being such that at least an average of one hydroxyl group per molecule of the polyol remains unreacted. The remaining functionality is then reacted with the unsaturated fatty acid adduct of an olefinically unsaturated dicarboxylic anhydride, such as maleic anhydride, this second esterification reaction being conducted under conditions so that esterification occurs through the anhydride ring, thereby introducing free acid groups into the molecule. Mixed acids of the class described are disclosed in Belgian Pat. No. 641,642, as well as in copending application Ser. No. 568,144, filed July 27, 1966 now abandoned.

In order to produce an electrodepositable composition, it is necessary to at least partially neutralize the acid groups present with a base in order to disperse the resin in the electrodeposition bath. Inorganic bases such as metal hydroxides, especially potassium hydroxide, can be used. There may likewise be used ammonia or organic bases, especially water-soluble amines, such as, for example, the mono-, di- and tri-lower alkyl amines such as methylamine, ethylamine, propylamine, butylamine, dimethylamine, diethylamine, dipropylamine, dibutylamine, and m-methyl-butylamine, triethylamine, tributylamine, methyldiethylamine, dimethylbutylamine, and the like; cyclic amines, such as morpholine, pyrrolidine, piperidine; diamines such as hydrazine, methylhydrazine, 2,3-toluene diamine, ethyl diamine and piperazine, and substituted amines such as hydroxylamine, ethanolamine, diethanolamine, butanolamine, hexanolamine and methyldiethanolamine, octanolamine, diglycolamine and other polyglycol amines, triethanolamine, and methylethanolamine, n-amino-ethanolamine and methyldiethanolamine, and polyamines such as diethylene triamine, triethylene tetramine, hexamethylene tetramine.

There may be present in the electrodepositable composition in addition to the antimony sulfide of the invention, any of the conventional types of pigments employed in the art, for example, iron oxide, lead silico chromate, strontuim chromate, carbon black, titanium dioxide, talc, barium sulfate and the like, as well as combinations of these and similar pigments. Color pigments such as cadmium yellow, cadmium red, phthalocyanine blue, chrome yellow, toluidine red, hydrated iron oxide, and the like, may be included if desired. There is often incorporated into the pigment composition a dispersing or surface active agent. If such a surface active agent is used, it should be the non-ionic or anionic type in the case of polyacid vehicles, or a combination of these types. In the case of polybasic resin, non-ionic or cationic agents are preferred. Usually the pigment and surface active agent, if any, are ground together in a portion of the vehicle, or alone, to make a paste and this is blended with the vehicle to produce a coating composition.

In many instances, it is preferred to add to the bath in order to aid dispersibility, viscosity and/or film quality, a non-ionic modifier or solvent. Examples of such materials are aliphatic, naphthenic and aromatic hydrocarbons or mixtures of the same; mono- and dialkyl ethers of glycols, pine oil and other solvents compatible with the resin system. The presently preferred modifier is 4-methoxy-4-methylpentanone-2 (Pent-Oxone).

There may also be included in the coating composition, if desired, additives such as antioxidants. For example, orthoamylphenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines, or their amides, esters of sodium isothionates, alkyl phenoxypolyethylene alkanols, or phosphate esters including ethoxylated alkylphenol phosphates. Other additives which may be employed include anti-foaming agents, suspending agents, bactericides, and the like.

In formulating the coating composition, ordinary tap water may be employed. However, such water may contain a relatively high level of metals and cations which, while not rendering the process inoperative, these cations may result in variations of properties of the baths when used in electrodeposition. Thus, in common practice, deionized water, i.e., water from which free ions have been removed by the passage through ion exchange resins, is invariably used to make up coating compositions of the instant invention.

In addition to the electrodeposition vehicle resins described above, there may be present in the electrodepositable composition other resinous materials which are non-carboxylic acid materials. For example, there may be added up to about 50 percent by weight of an amine-aldehyde condensation product. Examples of such amine-aldehyde condensation products employed are aldehyde condensation products of melamine, urea, acetoguanamine or a similar compound, and may be water-soluble or organic solvent-soluble. Generally, the aldehyde employed is formaldehyde, although useful products can be made from other aldehydes such as acetaldehyde, crotonaldehyde, acrolein, benzaldehyde, furfural and others. Condensation products of melamine or urea are the most common and are preferred, but products of other amines and amides in which at least one amido group is present can be employed.

For example, such condensation products can be produced with triazines, diazines, triazoles, guanidines, guanamines, and alkyl and aryl-substituted derivatives of such compounds, including alkyl-substituted and aryl-substituted cyclic ureas, and alkyl and aryl-substituted melamines. Examples of such compounds are: N,N'-dimethyl urea, benzyl urea, N,N'-ethylene urea, diazine diamide, formaguanamine, benzoguanamine, ammeline, 2-chloro-4,6-diamino-1,3,5-triazine, 3,5-diaminotriazole, 4,6-diaminopyrimidine, 2,4,6 - triphenyltriamino-1,3,5-triazine, and the like.

These aldehyde condensation products contain methylol groups or similar alkylol groups, depending upon the particular aldehyde employed. If desired, these methylol groups can be etherified by reaction with an alcohol. Various alcohols are employed for this purpose, including essentially any monohydric alcohol, although the preferred alcohols are methanol, butanol, and similar lower alkanols.

The amine-aldehyde condensation products are produced in a manner well known in the art, using acidic or basic catalysts and varying conditions of time and temperature. The aldehyde is often employed as a solution in water or alcohol, and the condensation, polymerization and etherification reactions may be carried out either sequentially or simultaneously.

Other base-solubilized polyacids which may be employed as electrodeposition vehicles include those taught in U.S. Pat. No. 3,382,165, which is incorporated herein by reference, wherein the acid groups rather than being solely polycarboxylic acid groups, contain mineral acid groups such as phosphonic, sulfonic, sulfate, and phosphate groups.

The process of the instant invention is equally applicable to cationic type vehicle resins, that is, poly-bases solubilized by means of an acid, for example, an amine-terminated polyamide or an acrylic polymer solubilized with acetic acid. One such class of materials is described in British Pat. No. 1,132,267. Another case of such cationic polymers is described in copending application Ser. No. 772,366, filed Oct. 28, 1968.

In a manner similar to the anionic resins described above, the cationic resins may be formulated with adjuvants, such as pigments, solvents, surfactants, crosslinking resins, and the like.

The polyacids are anionic in nature and are dispersed or dissolved in water with alkaline materials such as amines or alkaline metal hydroxides and, when subjected to an electric current, they migrate to the anode. The polybasic resins, solubilized by acids, are cationic in character and when these resins are water-dispersed or solubilized with an acid such as acetic acid, the material deposits on the cathode under an electric current.

The antimony sulfide is introduced into the compositions of the invention in the same manner as conventional pigments are dispersed. Preferably, the antimony sulfide is reduced to a small particle size, usually less than about 25 microns and, more preferably, below about 10 microns, before being added to the vehicle. If large particles of sulfide are introduced, the grinding will require more time and perhaps a filtration step to remove oversized particles remaining.

The antimony sulfide is dispersed by grinding, usually in the presence of at least a portion of the vehicle resin and, in most cases, a surfactant or dispersing agent. Grinding is accomplished by the use of ball mills, sand mills, Cowles dissolvers, continuous attritors, until the pigment has been reduced to the desired size and, preferably, has been wet by and dispersed in the vehicle resin and/or dispersing agent.

In the case of polyacid vehicle resins, preferably the grinding is conducted in an aqueous dispersion of neutralized resin having a pH above about 7 and preferably about 9.0. The amount of water present in such an aqueous grind is not critical; however, commonly the resin employed in the grinding step is about 30 to 70 percent solids. The use of more water merely reduces the effective capacity of the mill and while less water can be employed, the viscosity creates some problems in certain instances.

The pigment-binder ratio in the grinding step is not critical; however, levels between about 3.5/1 and 7/1 are frequently employed, although other levels may be utilized.

After grinding, the particle size should be in the range of 10 microns or less, preferably as small as practicable. Generally a Hegman grind gauge reading of about 0.6 is the minimum for a presently commercially acceptable composition.

For a general review of pigment grinding and paint formulation, reference may be had to: D. H. Parker, Principles of Surface Coating Technology, Interscience Publishers, New York, 1965; R. L. Yates, Electropainting, Robert Draper, Ltd., Teddington, England, 1966; H. F. Payne, Organic Coating Technology, vol. II, Wiley & Sons, New York, 1961.

It has been found especially important to regulate the ratio of pigment to the vehicle in compositions which are used in electrodeposition processes. In most instances, the most desirable coatings are obtained when the coating composition contains a ratio of pigment-to-vehicle of not lower than .8 to 1 and preferably not higher than 2 to 1. If the composition has too high a pigment-to-vehicle ratio, the electrodeposited films may exhibit very poor flow characteristics and, in many instances, are non-continuous and have poor film appearance.

In the electrodeposition process, a process well-described in the art, the aqueous bath containing the composition is placed in contact with an electrically conductive anode, and an electrically conductive cathode. The coating is deposited upon the appropriate electrode so that the conductive substrate to be coated is used as that electrode. Upon passage of electric current (normally direct current) between the anode and the cathode, while in contact with the bath containing the coating composition, an adherent film of the coating composition is deposited on the appropriate electrode.

The conditions at which the electrodeposition process is carried out are those conventionally used in electrodeposition. The applied voltage may vary greatly and can be as low as, for example, 1 volt, or as high, for example, as 500 volts or higher. It is typically between 50 and 350 volts. The current tends to decrease during electrodeposition and the films become electrically insulative and cause the deposition of film to be self-terminating at any particular voltage.

The electrode coated is preferably any electrically conductive metal, such as iron, steel, aluminum, galvanized steel, phosphatized steel, zinc, and the like.

The concentrations of the coating composition in the aqueous bath used in electrodeposition is not critical and relatively high levels of coating composition can be used. However, it is ordinarily desirable to use a low concentration of coating composition since this is one of the benefits inherent in this system. Baths containing as little as one percent by weight of the coating composition in water can be employed. In general practice, the baths used usually contain between 5 and about 15 percent by weight of paint solids. Generally it is preferred not to use more than 20 or 25 percent by weight of the coating composition in the bath, although there is no technical reason why films cannot be produced in even higher levels. Once the film is deposited upon the substrate and the substrate removed from the bath, the article is treated as one which has been coated in the conventional painting operation. The article may be air-dried or, usually, it is heated in an oven or by some other appropriate means to bake or dry the film. When this is done, the baking temperatures of about 275° F. to about 375° F. for 60 to 10 minutes are usually employed.

Throw power, the ability of an electrodeposition material to coat thin areas remote or shielded from the cathode, is measured by taking a strip of 5-mil phosphatized steel stock, 14.5 inches long by 0.5 inch wide, and punching the center of a 0.31 inch diameter hole 0.75 inch from one end of the strip and centering it in a 14-inch section of standard gas conduit (0.75 inch standard diameter), the upper 0.5 inch of which is partially cut off to allow bolting to an electrode support by means of a 0.31 inch diameter hole, the center of which is 0.5 inch distance from the upper end of the tube. The strip is inserted into the tube and both are fastened to electrode holders with a wing nut. The lower end of the strip is flush with the end of the tube.

The strip-tube electrode assembly is connected to the positive terminal and the metal coating tank to the negative terminal. The height of the coating tank should permit immersion of the electrodes to a depth of 10 inches. The exact clearances between the electrode assembly and the bottom and sides of the tank are not critical. In the tests conducted in the examples, the tank was a circular stainless steel tank with an internal diameter of approximately 5 inches and the bottom of the pipe was at least an inch above the bottom of the tank. Unless otherwise stated, the electrodeposition conditions were those which give 0.8 mil film thickness on a panel in two minutes. A power test was likewise conducted for two minutes unless otherwise specified. After coating, this strip is rinsed and baked at the schedule prescribed for the coating and then slightly rubbed with a soft pencil eraser at the feathered edge of the baked coating of the strip. The length of the coating remaining on the strip is measured and recorded as the relative throw power.

Acid values are conducted in the instant specification and were conducted in accordance with ASTM standard method 55–54 and equivalent. An acid value may be defined as the milligrams of KOH necessary to neutralize a one gram sample of the resin composition being tested. This method titrates only one-half of the anyhydride carboxyls.

The salt spray tests utilized in the examples are essentially equivalent to ASTM Test D–117–62 and involve exposing a scribed panel to a fog of a salt solution comprising 5 parts by weight salt and 95 parts distilled water at a relative humidity of 100 and a temperature of 95° F.

The saponification test conducted in the examples involves placing the panel to be tested in a $\frac{1}{10}$ normal sodium hydroxide solution at 100° F.

The invention is further described in conjunction with the following examples, which are to be considered illustrative rather than limiting. All parts and percentages in the examples and throughout this specification are by weight unless otherwise stated.

EXAMPLE A

A vehicle resin composition was produced by heating a 4-to-1 weight mixture of linseed oil and maleic anhydride under an inert gas blanket at 510° F. for 5 hours to obtain a resin having a final acid value of about 80 and a Brookfield viscosity of 90,000 centipoises.

EXAMPLE B

Into a reactor equipped with an agitator, thermometer, inert gas tube, reflux condenser and water trap were added 1050 parts of a hydrocarbon resin "Piccodiene 9215," an unsaponifiable, unsaturated resin possessing an iodine value of about 180, a softening point of about 100° C., and a molecular weight between about 250 and 900, derived from the polymerization of cyclic, straight and branched chain olefins obtained from petroleum cracking, and 1950 parts of linseed oil. The above mixture was agitated under an inert gas blanket and heated to 285° C. and held for one hour to a Gardner-Holdt viscosity of U–V at 90 percent non-volatates in xylene. The mixture was then cooled to 20° C. and 264 parts of maleic anhydride was added. The resultant mixture was heated to 260° C. and held for one hour, then the heating was discontinued and 150 parts of hydrogenated Bisphenol A was added. After 30 minutes the mixture had cooled to 140° C. and 370 parts of Pent-Oxone was added. The final composition had an acid number of 39.2 and a viscosity of 148,000 centipoises, and contained 90 percent non-volatates.

EXAMPLE I

An electrodepositable composition was prepared as follows:

A solubilized vehicle resin (Solubilized Resin I) was prepared as follows:

| | Parts by wt. |
|---|---|
| Maleinized linseed oil (as in Example A) | 304.1 |
| Diethylamine | 30.5 |

The above was mixed for 45 minutes and there was then added, with agitation:

| | |
|---|---|
| Cresylic acid | 3.0 |
| Deionized water | 304.1 |

After thorough mixing, there was added:

| | |
|---|---|
| Deionized water | 188.9 |

The pH of the above mixture was 7.0. The above mixture was designated Solubilized Resin I.

A second solubilized vehicle resin (Solubilized Resin II) was prepared as follows:

To a mixture of 13.9 parts of diethylamine in 348.0 parts of deionized water was added slowly, with agitation, the following.

| Premix: | Parts by wt. |
|---|---|
| Hydrocarbon resin-modified maleinized oil (as in Example B) | 321.0 |
| Pent-Oxone | 42.5 |

After thorough mixing, there was added:

| | |
|---|---|
| Cresylic acid | 3.2 |
| Deionized water | 101.0 |

The pH of the above mixture was 9.1. This mixture was designated Solubilized Resin II.

The primer was formulated by grinding the following in a steel ball mill:

| | Parts by wt. |
|---|---|
| Solubilized Resin I | 30.9 |
| Solubilized Resin II | 35.3 |
| Dispersing agent (combination oil-soluble sulfonate non-ionic surfactant—Witco 912) | 1.1 |
| Deionized water | 8.3 |
| Diethylamine | 1.8 |

The above was then adjusted to a pH of 10.2 with diethylamine. There was then added:

| | |
|---|---|
| Antimony sulfide | 53.9 |
| Strontium chromate | 2.9 |

The above mixture was ground to a 7 Hegman grind gauge reading and then there was added:

| | |
|---|---|
| Solubilized Resin II | 739.0 |

The above mixture was reduced to 10 percent solids to form the electrodeposition bath composition.

The above composition was deposited on polished phosphatized steel panels at a bath temperature of 80° F. at a voltage of 275 volts for 90 seconds. A film thickness of 0.8 mil was obtained. The panels were baked for 25 minutes at 360° F. and had a smooth appearance.

The above composition was also electrodeposited on strap steel at a voltage of 500 volts for two seconds. A 0.5 mil film was obtained. The panel was baked at 365° F. for 25 minutes and had a smooth appearance.

The bath displayed a throw power of 4 inches. After 456 hours salt spray, a scribed phosphatized steel panel showed $\frac{1}{32}$ to $\frac{1}{16}$ inch score rust with a few small blisters and $\frac{1}{32}$ to $\frac{1}{4}$ inch edge peeling.

Various other electropositable compositions, such as those hereinabove described, can be substituted for those of the examples. In the above and other tests, the general applicability of the composition and methods herein has been shown and it has been found that good results are attained using varying compositions, electrodeposition conditions and substrates.

According to the provisions of the patent statutes, there are described above the invention and what are now considered its best embodiments; however, within the scope of the appended claims, it is to be understood that the invention can be practiced otherwise than is specifically described.

What is claimed is:
1. An aqueous electrodepositable composition comprising an ionically solubilized synthetic organic vehicle resin having dispersed therein, in pigmentary form, antimony sulfide wherein the pigment-binder ratio is not higher than 2:1.
2. A composition as in claim 1 wherein the pigment-binder ratio is below 1:1.
3. A composition as in claim 1 wherein the vehicle resin comprises a base-solubilized synthetic polycarboxylic acid vehicle resin.
4. A composition as in claim 3 wherein the pigment-binder ratio is below 1:1.

References Cited

UNITED STATES PATENTS

| 3,483,109 | 12/1969 | Brane et al. | 204—181 |
| 3,493,483 | 2/1970 | Gacesa | 204—181 |

FOREIGN PATENTS

| 1,132,267 | 2/1966 | Great Britain | 204—181 |

OTHER REFERENCES

Organic Coating Technology, vol. II, Henry Payne, John Wiley & Sons, Inc., 1961. TP 935, p. 38.

Paint and Varnish Technology, William von Fischer, Reinhold Publishing Co., 1948. TP 935, v. 6.

DONALD E. CZAJA, Primary Examiner

E. C. RZUCIDLO, Assistant Examiner

U.S. Cl. X.R.

117—132; 204—181; 260—22R, 29.6NR, 29.6MN, 29.6MM, 37R